United States Patent Office 3,732,246
Patented May 8, 1973

3,732,246
N-SUBSTITUTED NAPHTHALENE-
DICARBOXIMIDES
Eugene R. Wagner, Zionsville, Ind., assignor to The Dow
Chemical Company, Midland, Mich.
No Drawing. Original application May 24, 1968, Ser. No.
731,744, now Patent No. 3,546,238. Divided and this
application Sept. 25, 1970, Ser. No. 75,763
Int. Cl. C07d 27/52
U.S. Cl. 260—326 C       5 Claims

ABSTRACT OF THE DISCLOSURE

N-substituted-1,4,5,8-tetrahydro - 4a,8a - naphthalenedicarboximides wherein the N-substituent is phenyl, monohalophenyl, pyridyl, tolyl or xylyl are prepared by the reaction of an amine such as an aminopyridine or a haloaniline with 1,4,5,8-tetrahydro-4a,8a-naphthalene dicarboxylic acid anhydride. The novel compounds are useful as central nervous system depressants and sedatives.

CROSS-REFERENCE TO RELATED APPLICATIONS

This is a division of application Ser. No. 731,744, filed May 24, 1968, now U.S. Pat. No. 3,546,238.

DESCRIPTION OF THE PRIOR ART

The compounds of the present invention can be prepared by the reaction of an amine such as an aminopyridine, aniline, toluidine, xylidene or a haloaniline with 1,4,5,8 - tetrahydro-4a,8a-naphthalene dicarboxylic acid anhydride in methods analogous to those described by Wagner and Rudzik, Journal of Medicinal Chemistry, 10, 607 (1967).

The 1,4,5,8-tetrahydro-4a,8a-naphthalene dicarboxylic acid anhydride employed as a starting material herein can be prepared by methods analogous to those of Alder et al., Berichte, 71B, 2199 (1938) or Brigl et al., Berichte, 71B, 2280 (1938). For example, a mixture of acetylene dicarboxylic acid, dioxane and butadiene is heated in a bomb at 170° C. for 20 hours. The mixture is cooled and evaporated in vacuo, the evaporation residue crystallizing on standing. The residue is mixed with warm carbon tetrachloride and filtered, the 1,4,5,8-tetrahydro-4a,8a-naphthalene dicarboxylic acid filter cake being reserved. The filtrate is diluted with additional carbon tetrachloride until a precipitate forms. The filtrate is again filtered and the resulting filtrate is cooled and evaporated in vacuo to precipitate a crystalline solid. The solid is recrystallized from carbon tetrachloride to obtain 1,4,5,8-tetrahydro-4a, 8a-naphthalene dicarboxylic acid anhydride. The 1,4,5,8-tetrahydro-4a,8a-naphthalene dicarboxylic acid filter cake obtained in the first filtration can be converted to the anhydride by treatment with refluxing acetyl chloride.

SUMMARY OF THE INVENTION

This invention is concerned with novel substituted-naphthalenedicarboximides and is particularly directed to N-substituted-1,4,5,8-tetrahydro - 4a,8a - naphthalenedicarboximides wherein the substituent is pyridyl, phenyl, monohalophenyl, tolyl or xylyl. Such compounds correspond to the formula

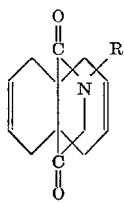

wherein R represents pyridyl, phenyl, monohalophenyl, tolyl or xylyl. In the present specification and claims, the term "halo" is employed to designate fluoro, chloro and bromo. The novel substituted-naphthalenedicarboximides are crystalline solids which are soluble in organic solvents such as ethanol, benzene and acetone and only slightly soluble in water.

The novel compounds are useful for administration to laboratory animals in studying the behavior thereof and in studying drug effects on the central and peripheral nervous system. They are particularly useful as central nervous system depressants and for administration to animals for potentiation of barbiturates and as sedatives. The compounds wherein R is pyridyl, chlorophenyl or bromophenyl are particularly potent depressants and are preferred compounds for central nervous system depressant use. The compounds also have herbicidal activity and for such uses, a preferred compound is N-(2-pyridyl)-1,4,5,8-tetrahydro-4a,8a-naphthalenedicarboximide.

The substituted-naphthalenedicarboximides of the invention can be prepared by the reaction of 1,4,5,8-tetrahydro-4a,8a-napthalene dicarboxylic acid anhydride with an amine which can be an aminopyridine, aniline, a haloaniline, a toluidine or a xylidene. Representative amines which can be employed as starting materials include 2-, 3- and 4-aminopyridine, aniline, 2-, 3- and 4-bromoaniline, o-, m- and p-toluidine and 2,3-, 2,4-, 2,5-, 2,6-, 3,4- and 3,5-xylidene. The reaction proceeds when the reactants are contacted and mixed and heated at a temperature of from about 140° to about 250° C. and preferably from about 195° to 210° C. The exact proportions of the reactants to be employed are not critical, some of the desired product being obtained when the reactants are combined in any proportions. However, the reaction consumes the reactants in equimolar proportions, and the use of the reactants in such proportions is desirable, the use of an excess of the amine reactant being preferred. The reaction is generally complete after heating for from about 5 to 20 minutes at a temperature within the reaction temperature range. The substituted-naphthalenedicarboximides can be separated by conventional methods such as trituration of the cooled mixture with a lower alkanol, crystallization from inert organic solvents such as methanol or ethanol and filtration or centrifugation. The product can be purified by such conventional methods as recrystallization.

In the preparation of the substituted-naphthalenedicarboximides of the invention, 1,4,5,8-tetrahydro4a,8a-naphthalene dicarboxylic acid anhydride is mixed together with aniline, aminopyridine, haloaniline, toluidine or xylidene in any order or fashion. The reactants are conveniently mixed directly in the absence of a solvent. However, if it is desired to employ a solvent in mixing the starting materials, the 1,4,5,8-tetrahydro-4a, 8a-naphthalene dicarboxylic acid anhydride can conveniently be dispersed in an inert organic solvent such as ether and the amine added slowly to the resulting mixture. The mixture can then be separated from the solvent by filtration or evaporation. The mixture of reactants is then heated to a temperature within the reaction temperature range for a short period of time, usually from about 5 to about 20 minutes, after which the mixture is cooled. The substituted-naphthalenedicarboximide product is separated by crystallization from an inert organic solvent such as ethanol. The crystallization can be accomplished conveniently by taking up the cooled reaction mixture in hot ethanol and cooling the ethanol mixture, with or without scratching or seeding to promote crystallization. The product can be purified by conventional methods such as recrystallization from ethanol, methanol or propanol.

DESCRIPTION OF THE PREFERRED EMBODIMENTS

The following examples are illustrative of the invention but are not to be construed as limiting the same.

Example 1

Two grams of 1,4,5,8-tetrahydro-4a,8a-naphthalene dicarboxylic acid anhydride are mixed together with two grams of 3-aminopyridine and the resulting mixture is heated in an oil bath at a temperature of 188°–189° C. for fifteen minutes. The reaction mixture is allowed to cool slowly. The N-(3-pyridyl)-1,4,5,8-tetrahydro-4a,8a-naphthalenedicarboximide product is crystallized from 10 milliliters of ethanol, recrystallized twice from ethanol and found to melt at 116°–117° C. The product is formed by analysis to have carbon, hydrogen and nitrogen contacts of 73.32, 5.99 and 9.99 percent, respectively, as compared with the theoretical contents of 72.84, 5.75 and 9.99 percent, respectively, calculated for the named structure. The structure of the product is confirmed by infrared spectroscopy.

Example 2

Two grams of 4-aminopyridine are mixed with two grams of 1,4,5,8-tetrahydro-4a,8a-naphthalene dicarboxylic acid anhydride and the mixture is heated in an oil bath at a temperature of about 190° C. for about fifteen minutes. The reaction mixture is cooled and about 10 milliliters of hot ethanol are mixed therewith. The resulting mixture is cooled whereupon a crystalline solid precipitates. Precipitation of the solid is increased by scratching with a glass rod. The solid is separated by filtration and recrystallized from ethanol. The N-(4-pyridyl)-1,4,5,8-tetrahydro - 4a,8a-naphthalenedicarboximide product is found to melt at 111°–113° C. and is found by analysis to have carbon, hydrogen and nitrogen contents of 72.41, 5.90 and 10.07 percent, respectively, as compared with the theoretical contents of 72.84, 5.75 and 9.99 percent, respectively, calculated for the named structure.

Example 3

Two grams of 1,4,5,8-tetrahydro-4a,8a-naphthalene dicarboxylic acid anhydride are mixed with two grams of 2-aminopyridine and the mixture is heated in an oil bath at a temperature of about 188° C. for about fifteen minutes. The reaction mixture is cooled and about 10 milliliters of hot ethanol are added thereto. The mixture is cooled and triturated whereupon a crystalline solid precipitates. The solid is separated by filtration and recrystallized from ethanol. The N-(2-pyridyl)-1,4,5,8-tetrahydro-4a,8a-naphthalenedicarboximide product is found to melt at 136°–137° C. and is found by analysis to have carbon, hydrogen and nitrogen contents of 72.76, 5.81 and 10.08 percent, respectively, as compared with the theoretical contents of 72.84, 5.75 and 9.99 percent, respectively, calculated for the named structure.

Example 4

Two grams of 1,4,5,8-tetrahydro-4a,8a-naphthalene dicarboxylic acid anhydride are mixed together with two grams of 4-bromoaniline. The resulting mixture is heated at a temperature of about 190° C. for about fifteen minutes. The reaction mixture is then cooled and mixed with 10 milliliters of hot ethanol. The resulting mixture is allowed to cool to room temperature and is triturated, whereupon a crystalline solid precipitates. the precipitate is separated by filtration and recrystallized from ethanol. The N-(4-bromophenyl)-1,4,5,8 - tetrahydro-4a,8a-naphthalene dicarboximide product is found to melt at 134°–135° C. and is found by analysis to have hydrogen, nitrogen and bromine contents of 4.45, 22.66 and 4.02 percent, respectively, as compared with the theoretical contents of 4.50, 22.31 and 3.91 percent, respectively, calculated for the named structure.

In substantially the same procedure, the following substituted-naphthalenedicarboximides are prepared.

N-(3-bromophenyl) - 1,4,5,8-tetrahydro-4a,8a-naphthalenedicarboximide, a crystalline solid having a molecular weight of 358.3, is prepared by mixing 1,4,5,8-tetrahydro-4a,8a-naphthalene dicarboxylic acid anhydride with an excess of 3-bromoaniline, heating the mixture at a temperature of about 185°–195° C., taking the product up in ethanol and then crystallizing the product from the ethanol mixture.

N-(2-bromophenyl)-1,4,5,8 - tetrahydro-4a,8a-naphthalenedicarboximide, having a molecular weight of 358.3, is prepared by mixing 1,4,5,8-tetrahydro-4a,8a-naphthalene dicarboxylic acid anhydride with an excess of 2-bromoaniline, heating the mixture and separating the product by crystallization from ethanol.

Example 5

Two grams of 1,4,5,8-tetrahydro-4a,8a-naphthalene dicarboxylic acid anhydride are mixed with 1.5 grams of 3-chloroaniline and the mixture is heated in an oil bath at a temperature of about 189° C. for about fifteen minutes. The reaction mixture is cooled and mixed with 10 milliliters of hot ethanol. The resulting mixture is cooled slowly and triturated and a crystalline solid precipitate forms. The precipitate is separated by filtration and recrystallized from ethanol. The N-(3-chlorophenyl)-1,4,5,8-tetrahydro-4a,8a-naphthalenedicarboximide product is found to melt at 148°–149° C. and is found by analysis to have carbon, hydrogen, nitrogen and chlorine contents of 69.10, 5.32, 11.35 and 4.59 percent, respectively, as compared with the theoretical contents of 68.90, 5.14, 11.30 and 4.46 percent, respectively, calculated for the named structure. The structure of the named product is further confirmed by infrared and nuclear magnetic resonance spectroscopy.

In substantially the same procedure, the following substituted-naphthalenedicarboximides are prepared.

N-(4-chlorophenyl)-1,4,5,8 - tetrahydro-4a,8a-naphthalenedicarboximide, having a molecular weight of 313.8 and melting at 118°–119° C., is prepared by mixing 1,4,5,8-tetrahydro-4a,8a-naphthalene dicarboxylic acid anhydride with an excess of 4-chloroaniline and heating the mixture at a temperature of about 190° C. for about ten minutes. The product is crystallized from ethanol and purified by recrystallization from ethanol.

N-(2-chlorophenyl)-1,4,5,8 - tetrahydro-4a,8a-naphthalenedicarboximide, having a molecular weight of 313.8, is prepared by mixing 1,4,5,8-tetrahydro-4a,8a-naphthalene dicarboxylic acid anhydride with an excess of 2-chloroaniline and heating the mixture at a temperature of about 190° C. The product is crystallized from ethanol.

Example 6

Five grams of 1,4,5,8-tetrahydro-4a,8a-naphthalene dicarboxylic acid anhydride are mixed with 5 grams of 4-fluoroaniline. The resulting mixture is heated at a temperature of about 180° C. for about fifteen minutes and then allowed to cool to room temperature. The mixture is then triturated with 15 milliliters of ethanol whereupon a crystalline precipitate forms. The precipitate is separated by filtration and the N-(4-fluorophenyl)-1,4,5,8-tetrahydro-4a,8a - naphthalenedicarboximide product is found to melt at 122.5°–123.5° C. The structure of the product is confirmed by infrared spectroscopy.

N-(2-fluorophenyl)-1,4,5,8 - tetrahydro-4a,8a-naphthalenedicarboximide, having a molecular weight of 330.3, is prepared by employing 2-fluoroaniline in lieu of 4-fluoroaniline in the procedure described above.

N-(3-fluorophenyl)-1,4,5,8 - tetrahydro-4a,8a-naphthalenedicarboximide, melting at 133°–134° C., is prepared by employing 3-fluoroaniline in lieu of 4-fluoroaniline in the procedure described above.

Example 7

Three grams of 1,4,5,8-tetrahydro-4a,8a-naphthalene dicarboxylic acid anhydride are mixed well with three grams of 2-toluidine and the mixture is heated to a temperature of about 188° C. and held for about ten minutes. The reaction mixture is cooled and triturated with about 15 milliliters of ethanol. The mixture is filtered and the filter cake is recrystallized from ethanol. The N-(2-tolyl)-1,4,5,8-tetrahydro-4a,8a-naphthalenedicarboximide product is found to melt at 164°–165° C.

In substantially the same procedure, the following substituted-naphthalenedicarboximides are prepared.

N-(3 - tolyl) - 1,4,5,8 - tetrahydro-4a,8a-naphthalenedicarboximide, melting at 164°–165° C., is prepared by mixing 1,4,5,8-tetrahydro-4a,8a-naphthalene dicarboxylic acid anhydride with an excess of 3-toluidine and heating the mixture at a temperature of about 190° C.

N-(4 - tolyl) - 1,4,5,8 - tetrahydro-4a,8a-naphthalenedicarboximide, melting at 124°–125° C., is prepared by mixing 1,4,5,8-tetrahydro-4a,8a-naphthalene dicarboxylic acid anhydride with an excess of 4-toluidine and heating the mixture at a temperature of about 185° C.

Example 8

To grams of 1,4,5,8-tetrahydro-4a,8a-naphthalene dicarboxylic acid anhydride are mixed with two grams of 3,4-xylidene and the mixture is heated in an oil bath at a temperature of about 190° C. for about fifteen minutes. The reaction mixture is cooled and about 15 milliliters of hot ethanol are added thereto. A crystalline solid precipitates on cooling the mixture. The solid is separated by filtration and recrystallized from ethanol. The N-(3,4-xylyl)-1,4,5,8 - tetrahydro - 4a,8a - naphthalenedicarboximide product is found to melt at 158°–159° C.

In substantially the same procedure, the following substituted-naphthalenedicarboximides are prepared.

N-phenyl - 1,4,5,8 - tetrahydro-4a,8a-naphthalenedicarboximide, melting at 130°–132° C., is prepared by employing aniline in lieu of 3,4-xylidene in the procedure described above.

N-(2,4-xylyl) - 1,4,5,8 - tetrahydro-4a,8a-naphthalenedicarboximide, melting at 158°–159° C., is prepared by employing 2,4-xylidene in lieu of 3,4-xylidene in the procedure described above.

N-(2,5-xylyl) - 1,4,5,8 - tetrahydro-4a,8a-naphthalenedicarboximide, having a molecular weight of 307.3, is prepared by employing 2,5-xylidene in lieu of 3,4-xylidene in the procedure described above.

The compounds of the invention can be employed to control the growth of plants, or they can be administered to animals in the study of the behavior thereof and in the study of drug effects on the central and peripheral nervous system thereof. The compounds are typically administered to animals in a depressant amount and at dosages from about 50 milligrams per kilogram of animal body weight to about 250 milligrams per kilogram of animal body weight. Higher or lower dosages can also be employed, depending upon the particular compound employed and upon such factors as age, species, size and physical condition of the animal, route of administration and the effect desired. The substituted-naphthalenedicarboximide compounds can be administered orally in the form of tablets, capsules, elixirs, syrups, emulsions, dispersible powders and the like, or by injection in the form of sterile injectable suspensions or solutions. When the compounds of the invention are employed as depressants or as plant growth control agents, they are advantageously combined with one or more additaments or adjuvants. Useful compositions comprise one or more compounds of the invention and one or more additaments including inert diluents, solvents, dispersing agents, emulsifying agents, wetting agents, suspending agents and the like. When the composition is administered to animals, carriers which are pharmaceutically acceptable are employed.

In representative operations, the compounds of the invention, when employed as depressants in mice with barbiturates such as hexobarbital, give excellent increases in sleep time. In such operations, the mice are administered the compounds intraperitoneally at a dosage of 215 milligrams per kilogram of body weight one hour prior to the intraperitoneal administration of hexobarbital at a dosage of 100 milligrams per kilogram. In such operations, mice administered one of N-(4 - pyridyl) - 1,4,5,8-tetrahydro-4a,8a - naphthalenedicarboximide and N - (4-bromophenyl)-1,4,5,8 - tetrahydro - 4a,8a - naphthalenedicarboximide have sleep times 6.9 and 2.4 times as great, respectively, as similar check mice receiving only hexobarbital. In additional operations, the depressant activity upon the central nervous system is illustrated by the reinduction of sleep following the normal period of sleep induced in mice by the intraperitoneal administration of hexobarbital at a dosage of 100 milligrams per kilogram. In such representative operations, N-(2-pyridyl) - 1,4,5,8-tetrahydro-4a,8a - naphthalenedicarboximide and N - (3-chlorophenyl) - 1,4,5,8 - tetrahydro - 4a,8a - naphthalenedicarboximide give excellent reinduction of sleep when administered intraperitoneally immediately subsequent to the hexobarbital-induced sleep period at intraperitoneal dosages of 60 milligrams per kilogram.

The compounds of the invention are also employed for the control of plants. In representative operations, complete controls and kills of pigweed are obtained when a liquid composition containing N - (2 - pyridyl) - 1,4,5,8-tetrahydro - 4a,8a - naphthalenedicarboximide as the sole toxicant is applied as a soil drench at a dosage rate of 50 pounds of toxicant per acre to soil seeded with viable seeds of pigweed, and the soil is thereafter held under conditions conducive to plant growth.

What is claimed is:

1. A substituted 1,4,5,8 - tetrahydro - 4a,8a - naphthalenedicarboximide compound corresponding to the formula

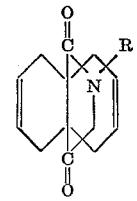

wherein R is a member of the group consisting of phenyl, monohalophenyl, tolyl and xylyl.

2. The compound of claim 1 wherein the compound is N-(monohalophenyl)-1,4,5,8-tetrahydro - 4a,8a - naphthalenedicarboximide.

3. The compound of claim 2 wherein the compound is N-(4-bromophenyl)-1,4,5,8 - tetrahydro - 4a,8a - naphthalenedicarboximide.

4. The compound of claim 2 wherein the compound is N-(4-chlorophenyl)-1,4,5,8 - tetrahydro - 4a,8a - naphthalenedicarboximide.

5. The compound of claim 2 wherein the compound is N-(3-chlorophenyl) - 1,4,5,8 - tetrahydro - 4a,8a - naphthalenedicarboximide.

References Cited

UNITED STATES PATENTS 3,546,238   12/1970   Wagner _____ 260—295

OTHER REFERENCES

Wagner et al.: J. Med. Chem., vol. 10(4), pp. 607–11, July 1967.

ALEX MAZEL, Primary Examiner

J. A. NARCAVAGE, Assistant Examiner